May 22, 1951          C. V. NACEY          2,554,049
FISH LURE
Filed April 14, 1949
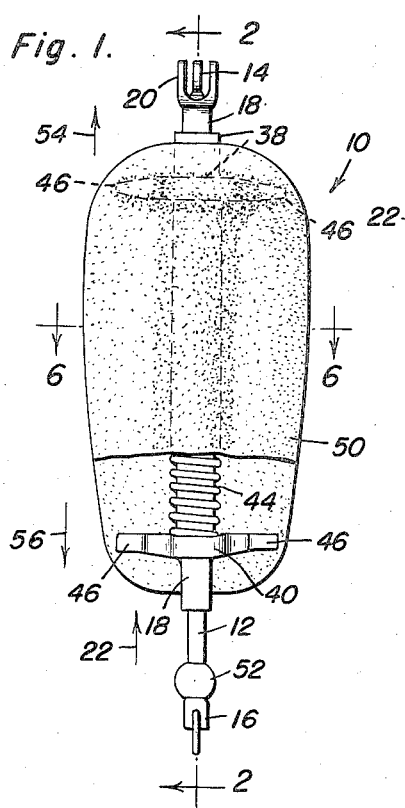
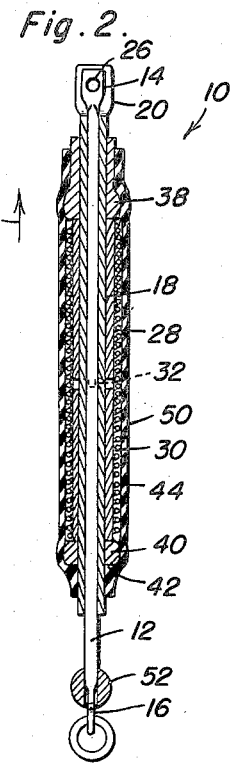
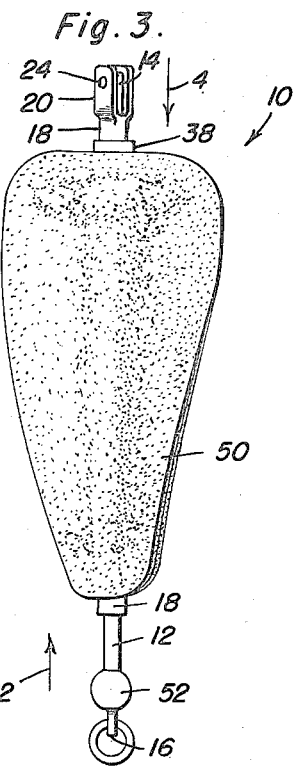
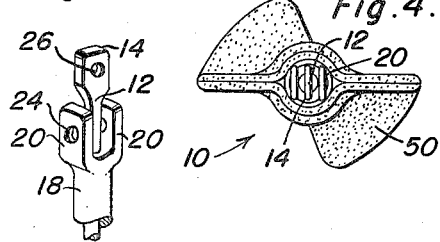
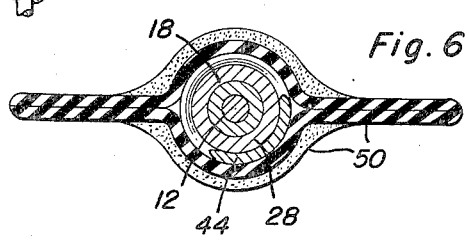
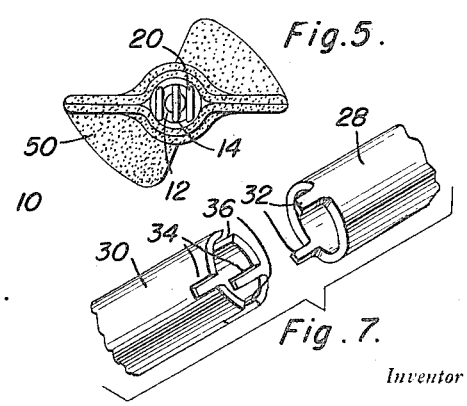
Inventor
Clifford V. Nacey
By *Clarence A. O'Brien and Harvey B. Jacobson*
                                                 Attorneys Patented May 22, 1951

2,554,049

UNITED STATES PATENT OFFICE 2,554,049

FISH LURE

Clifford V. Nacey, St. Paul, Minn.

Application April 14, 1949, Serial No. 87,461

7 Claims. (Cl. 43—42.2)

This invention relates to new and useful improvements and structural refinements in fish lures, and the principal object of the invention is greatly to facilitate untwisting of a twisted fishing line, while the line is being drawn through water.

This object is achieved by the provision of the fish lure having a flexible body which is normally flat, but may be twisted in either a clockwise or a counter-clockwise direction, so that when it is drawn through water it is caused to rotate in one direction or the other, thus axially rotating the fishing line therewith.

One important feature of the invention resides in the provision of means for retaining the body of the fish lure in a predetermined position, flat or twisted, while another feature of the device involves the provision of means for selectively rotating the fishing line together with the lure and facilitating independent rotation of the lure per se without rotating the fishing line.

Some of the advantages of the invention lie in its simplicity of construction, in its convenient and simple operation and in its adaptability to economical manufacture.

With the above more important objects and features in view and such other objects and features as may become apparent as this specification proceeds, the invention consists essentially in the construction and arrangement of parts as shown in the accompanying drawings in which:

Figure 1 is a plan view of the invention, the same being partially broken away so as to reveal its construction;

Figure 2 is a cross-sectional view, taken substantially in the plane of the line 2—2 in Figure 1;

Figure 3 is a plan view, similar to that shown in Figure 1, but illustrating the invention as being twisted in a counter-clockwise direction;

Figure 4 is an end view, taken in the direction of the arrow 4 in Figure 3;

Figure 5 is an end view, similar to that shown in Figure 4 but illustrating the lure as being twisted in a clockwise direction;

Figure 6 is a cross-sectional view, taken substantially in the plane of the line 6—6 in Figure 1;

Figure 7 is a fragmentary group perspective view of the locking sleeves used in the invention; and Figure 8 is a fragmentary perspective view of the subject shown in the upper portion of Figure 3, but with the parts disengaged to permit relative rotation.

Like characters of reference are employed to designate like parts in the specification and throughout the several views.

Referring now to the accompanying drawings in detail, the invention consists of a fish lure designated generally by the reference character 10, the same embodying in its construction a rod or stem 12 having flattened ends 14, 16 provided with apertures whereby the entire lure may be attached to a fishing line and to a fish hook, respectively, the fishing line and hook not being illustrated in the accompanying drawings.

A tube 18 is rotatably and slidably positioned on the stem 12 and is formed at one end thereof with a bifurcated portion 20 which is adapted to receive therein the flattened portion 14 of the stem in such manner that substantial relative rotation of the stem and tube is prevented as long as the portion 14 of the stem is in the bifurcated portion 20 of the tube, as shown in Figures 1, 2 and 3. However, when the stem 12 is slid in the tube 18 in the direction of the arrow 22, the stem portion 14 is withdrawn from the bifurcated portion 20 and rotation of the stem in the tube is facilitated.

It may be explained at this point that the furcations 20 are provided with aligned apertures 24 which are registerable with the aperture 26 formed in the portion 14 of the stem when the portion 14 is disposed between the furcations 20, and the fishing line may be threaded selectively through all the apertures 24, 26 or only through the aperture 26, as will be hereinafter more fully described.

A pair of coaxial locking sleeves 28, 30 are positioned on the tube 18, the inner end of the sleeve 28 being provided with a pair of diametrically opposed lugs or detents 32, while the adjacent inner end of the sleeve 30 is provided with two pairs of diametrically opposed and open-ended slots or notches 34, 36.

Suitable bosses 38, 40 are secured to the outer ends of the sleeves 28, 30, respectively, the boss 38 together with the sleeve 28 being freely rotatable on the tube 18, while the boss 40 together with the sleeve 30 is secured to the tube 18 as at 42. (See Figure 2.)

A helical spring 44 is positioned on the sleeves 28, 30, one end of this spring being secured to the boss 38 while the remaining end of the spring is secured to the boss 40, it being noted that the bosses 38, 40 are provided with diametrical, laterally extending wings 46, the purpose of which will be hereinafter more fully described.

A fish lure body 50 is provided on the spring 44 and on the bosses 38, 40 as well as the wings 46, the body 50 preferably being formed from resilient material such as rubber, whereby it may be stretched longitudinally as well as axially twisted.

Finally, it may be explained that a spherical anti-friction element or ball 52 is rotatably positioned on the stem 12 between the end of the tube 18 and the flattened portion 16 of the stem 12, as will be clearly apparent.

When the invention is placed in use, a fishing line may be threaded through the apertures 24, 26 and with the detents or lugs 32 engaging the pair of notches 34, the body 50 of the lure will be in a flat position as shown in Figures 1 and 6, under which circumstances the lure may be drawn through water by means of the fishing line without any amount of rotation. However, when it is desired to untwist a twisted fishing line, the end portions of the body 50 may be grasped by the fingers and drawn in opposite directions as indicated at 54, 56 in Figure 1, by which action the body 50 will be longitudinally stretched, the spring 44 will be similarly stretched, and the detents 32 will be withdrawn from the notches or recesses 34. Thereupon, by holding one end portion of the body 50 and axially twisting the remaining end portion, the body of the lure may be twisted in one direction or the other to the position shown in Figures 3, 4 or Figure 5, depending upon the direction in which the lure is desired to rotate when in use. As soon as pulling pressure on the body 50 in the directions 54, 56 is released, the spring 44 and the inherent resiliency of the body 50 will cause the locking sleeves 28, 30 to be drawn together so that the detents 32 are engaged with the notches 36, whereby the body 50 will be effectively retained in its twisted position, clockwise or counter-clockwise as the case may be.

It should be explained that the flexible, resilient nature of the body 50 does not impair the action of the spring 44, the intermediate longitudinal portion of the body providing sufficient clearance for the spring. However, the laterally projecting wings 46 of the bosses 38, 40 assure that axial rotation or twisting of the end portions of the body is transmitted to the sleeves 28, 30 and to the respective bosses 38, 40, as will be clearly apparent.

It is to be noted that the spring 44 not only urges the sleeves 28, 30 together so as to engage the locking means 32, 36, but, by resisting axial twisting, the spring also urges the body 50 to its initial flat position.

Rotation of the fishing lure, in one direction or the other, will of course be transmitted to the fishing line by means of the portions 14, 20, so that the line may become untwisted, when so desired. However, when it is preferable to facilitate rotation of the fishing lure without rotating the fishing line, the fishing line may be withdrawn from the apertures 24, 26 and the stem 12 may be slid in the direction of the arrow 22 in the tube 18, after which the fishing line may be threaded through the aperture 26 only, whereby the body 50, together with the spring 44, sleeves 28, 30 and tube 18 will be free to rotate, but the stem 12 together with the fishing line will remain relatively stationary. In such circumstances, the end portion of the tube 18 will bear against the anti-friction element 52, it being understood that the body 50 may be either flat or twisted in a clockwise or counter-clockwise direction even in instances where no rotation is to be imparted to the fishing line.

It is believed that the advantages and use of the invention will be clearly apparent from the foregoing disclosure, and accordingly, further description thereof at this point is deemed unnecessary.

Having described the invention, what is claimed as new is:

1. In a fish lure, the combination of a stem adapted for attachment to a fishing line, a flexible body mounted on said stem and adapted to be axially twisted thereon selectively in clockwise and counter-clockwise directions from a substantially flat position to respectively clockwise screw-shaped and counter-clockwise screw-shaped positions, resilient means for urging said body to its flat position, and releasable means for locking said body selectively in the flat and screw-shaped positions.

2. In a fish lure, the combination of a stem provided in one end portion thereof with a transverse aperture to receive a fishing line, a sleeve member slidable and rotatable on said stem, and a body carried by said sleeve member, one end portion of the sleeve member being provided with a pair of diametrically opposed fishing line receiving apertures registerable with the aperture in the stem, whereby said stem may rotate with said body when a fishing line is threaded through the first and second mentioned apertures, and whereby the body may rotate independently of the stem when a fishing line is threaded through the aperture in the stem only and the stem is withdrawn from the end portion of the sleeve member.

3. The device as defined in claim 2 wherein the apertured end portion of said stem is constituted by a flat tab, said sleeve member being provided with a pair of furcations spaced apart by a distance lesser than the width of said tab, said furcations having the second mentioned apertures provided therein and said tab being disposed between the furcations when the first and second mentioned apertures are in register whereby to prevent substantial relative rotation of the sleeve member and stem.

4. In a fish lure, the combination of a stem adapted for attachment to a fishing line, a pair of coaxial sleeves slidable and independently rotatable on said stem, an elongated body of flexible and yieldable material having opposite end portions thereof secured to the respective sleeves whereby the same may be twisted selectively in clockwise and counterclockwise directions from a substantially flat position, and coacting locking means provided at the adjacent ends of said sleeves for preventing relative rotation thereof whereby to sustain said body in a predetermined flat or twisted position.

5. The device as defined in claim 4 wherein said means comprise longitudinally projecting detents provided on one of said sleeves, the other sleeve having notches to receive said detents when the sleeves are slid together on said stem.

6. The device as defined in claim 5 together with resilient means for sliding said sleeves together.

7. In a fishing lure, the combination of a stem adapted for attachment to a fishing line, a pair of coaxial sleeves slidable toward and away from each other and independently rotatable on said stem, coacting locking means provided at the adjacent ends of said sleeves for preventing relative rotation thereof when the same are slid together, an elongated body of resilient material having opposite end portions thereof secured to the respective sleeves whereby the same may be stretched to disengage said locking means and twisted selectively in clockwise and counterclockwise directions from a substantially flat position, and a coil spring positioned on said sleeves within said body and having its opposite ends secured to the respective sleeves, whereby to resist relative rotation of the sleeves and to urge the same together to engage said locking means.

CLIFFORD V. NACEY.

REFERENCES CITED

The following references are of record in the file of this patent:

UNITED STATES PATENTS

| Number | Name | Date |
|---|---|---|
| 574,993 | Hinckley | Jan. 12, 1897 |
| 1,427,147 | Barsch | Aug. 29, 1922 |
| 1,573,288 | Wilson | Feb. 16, 1926 |
| 1,620,972 | Hobbs | Mar. 15, 1927 |
| 1,777,004 | Lemere et al. | Sept. 30, 1930 |
| 1,842,591 | Dunkelberger | Jan. 26, 1932 |
| 2,475,101 | Kosash | July 5, 1949 |